UNITED STATES PATENT OFFICE.

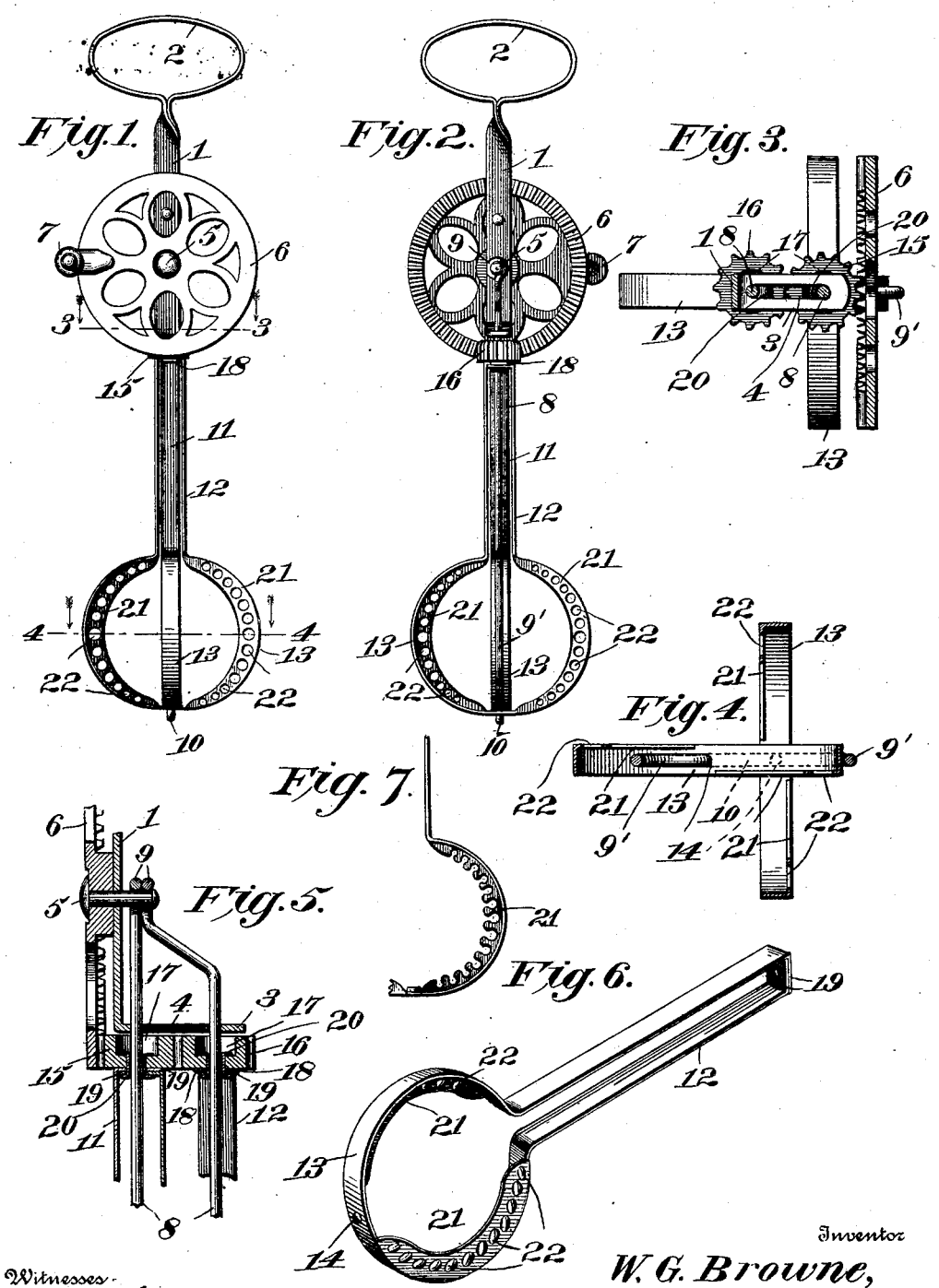

WILLIAM G. BROWNE, OF KINGSTON, NEW YORK.

EGG-BEATER.

SPECIFICATION forming part of Letters Patent No. 678,456, dated July 16, 1901.

Application filed October 12, 1900. Serial No. 32,856. (No model.)

*To all whom it may concern:*

Be it known that I, WILLIAM G. BROWNE, a citizen of the United States, residing at Kingston, in the county of Ulster and State of New York, have invented certain new and useful Improvements in Egg-Beaters; and I do declare the following to be a full, clear, and exact description of the invention, such as will enable others skilled in the art to which it appertains to make and use the same.

My invention relates to improvements in egg-beaters, and has for its object to provide a rotary beater of simple construction whereby eggs and cream may be beaten and whipped in a minimum space of time.

The invention consists of certain novel features of construction, combination, and arrangement of parts, as will be hereinafter more fully described, and particularly pointed out in the appended claim.

In the accompanying drawings, Figure 1 is a front elevational view of an egg-beater embodying my invention. Fig. 2 is an inner side elevational view thereof. Fig. 3 is a horizontal section on line 3 3 of Fig. 1 looking toward the pinions. Fig. 4 is a sectional plan view on line 4 4 of Fig. 1. Fig. 5 is a vertical sectional view through the pinions and connecting parts. Fig. 6 is a detail perspective view of one of the beaters. Fig. 7 is a similar view of a fragment of a modified form of beater.

Like reference characters designate corresponding parts throughout the several views.

The numeral 1 in the drawings represents the handle of the beater, comprising a flat strip of metal bent upon itself and twisted to form a hand-loop 2 and having the lower end of one of its side members bent laterally and inwardly to form an arm 3, provided with a longitudinal slot 4. Through the side members of the handle portion of the beater, below the loop, is passed a pin 5, upon the outer end of which is mounted a drive-gear 6, having a handle 7, by which it may be operated. The two parallel side arms of an elongated loop-shaped beater-frame 8 extend upward through the slot 4 in the arm 3 and have their upper free ends bent to form eyes 9, which receive the inner end of the pin 5, which end of the pin is upset or riveted to hold the arms in place. The beater-frame 8 projects downwardly some distance below the arm 3 and has its side arms bowed or curved outwardly, as at 9', and then connected by a horizontal cross-piece 10, forming a base on which the beater is adapted to be rested when in use.

Upon the arms of the beater-frame are mounted reversely-rotating beaters 11 and 12, each consisting of a flat band or strip of metal bent centrally to form a nearly circular or bowed beating portion 13, having an opening 14, whereby it is fitted on the arm of the beater-frame. From this portion the ends of the strip project upward in parallel relation on opposite sides of the arm of the beater-frame, on which it is mounted, and the ends of the two beaters are connected to intermeshing pinions 15 and 16 in the following manner: Each pinion is formed with a central opening, through which the coöperating side arm of the beater-frame passes, and is countersunk at top, as shown at 17, and provided on its bottom with a pair of spaced lugs or shoulders 18, arranged upon diametrically opposite sides of said central opening. The upper or free extremities 19 of the ends of the beater are bent inwardly at right angles to form overlapping portions, which are perforated for passage of the coöperating arm of the beater-frame and lie between the said lugs or shoulders of the pinion and are held thereby from having an independent twisting or turning movement. A tubular rivet 20 is passed upward through these overlapping portions of the beater and through the said central opening of the pinion, and the upper end thereof is upset or clenched to engage the wall of the pinion at the base of the countersunk opening and to thereby hold the parts firmly connected. By this construction an extremely simple form of fastening is provided, whereby the parts are connected in a firm and durable manner. The pinions 15 and 16 mesh with each other, and the pinion 15 meshes with and receives motion from the drive-gear 6, whereby the beaters are adapted to be rapidly rotated in reverse directions.

In the operation of the device the beaters 13 rotate in opposite directions on the lower ends of the outwardly bowed or curved portions 9 of the beater-frame 8, each beater rotating about the curved or bowed portion of the frame upon which it is mounted and the construction and arrangement being such that as the beaters revolve one passes through the space or opening of the other, by which rapid beating action is effected, the cream or eggs being thrown by the sides of one beater against the sides of the opposite beater and also against the curved or bowed portions 9 of the beater-frame, causing the material to be quickly whipped or beaten up. To provide for a much more thorough and effective beating action than has been obtained heretofore, I provide each beater 13 with crescent or segment shaped beating-flanges 21, projecting inwardly from the opposite sides thereof at diametrically opposite points, so that the flanges of one beater will in action force the material against the flanges of the other beater and provide for a quick and effective disruption of the constituents thereof. Each flange is formed with a series of apertures 22, through which the cream or eggs are forced as the beaters revolve and divided into a plurality of streams, thus distributing the same so that it may be more effectually disrupted and quicker and more thorough beating or whipping effected. The flanges 21 are arranged parallel with relation to each other and at right angles to the sides of the bow and have their concaved edges inwardly disposed. Said flanges in addition to acting as dividers are also adapted, by reason of their right-angular arrangement with the sides of the bow, to coöperate with said sides to form, when the beaters are rotated with the edge of the bow in advance, open gathering-pockets. The function of each gathering-pocket so formed is to momentarily retain and retard the material, preventing the same from flowing outwardly after being acted upon by one side of a bow and its flange, so as to adapt the same portion to be acted upon by the opposite side and flange of the same bow or following side and flange of the other bow before passing out of range of the bows, thus rendering the operation of the device much quicker and much more thorough and effective.

From the foregoing description, taken in connection with the accompanying drawings, the construction and mode of operation of my improved egg-beater will be readily understood, and it will be seen that it provides a simple, cheap, and durable form of device which possesses important advantages due to its peculiar construction alone.

While the preferred embodiment of the invention is as herein disclosed, it will of course be understood that changes in the form, proportion, and minor details of construction may be made within the scope of the invention without departing from the spirit or sacrificing any of the advantages thereof. For instance, instead of providing the beater-flanges with circular orifices the edges of said flanges may be indented, corrugated, or provided with slotted orifices, as shown in Fig. 7 of the drawings.

Having thus described my invention, what I claim, and desire to secure by Letters Patent, is—

A beater, comprising a pair of rotating bows mounted eccentrically with relation to each other to rotate one within the other, each of said bows being formed upon opposite sides with integral open-work beating-flanges projecting inwardly from diagonally opposite edges thereof and adapted to divide the material under treatment into a plurality of minute streams, said flanges being of crescent shape with their concaved edges inwardly disposed, and arranged at right angles to the sides of the bows and parallel with relation to each other and thereby forming upon each side or half of each bow right-angular beating-surfaces coöperating to form gathering-pockets and adapted to serve the combined purposes of a whipper and divider, substantially as set forth.

In testimony whereof I have hereunto set my hand in presence of two subscribing witnesses.

WILLIAM G. BROWNE.

Witnesses:
WILLIAM C. PRESTON,
MARTIN L. SPENCER.